United States Patent
Chunn et al.

(10) Patent No.: US 9,667,496 B2
(45) Date of Patent: May 30, 2017

(54) CONFIGURATION UPDATES ACROSS PEER STORAGE SYSTEMS

(71) Applicant: INTERNATIONAL BUSINESS MACHINES CORPORATION, Armonk, NY (US)

(72) Inventors: Adam C. Chunn, Houston, TX (US); William W. Hutsell, Houston, TX (US); Matthew S. Key, Katy, TX (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 14/139,939

(22) Filed: Dec. 24, 2013

(65) Prior Publication Data

US 2015/0180714 A1    Jun. 25, 2015

(51) Int. Cl.
*H04L 12/24* (2006.01)
*H04L 29/08* (2006.01)

(52) U.S. Cl.
CPC .......... *H04L 41/084* (2013.01); *H04L 41/082* (2013.01); *H04L 67/1097* (2013.01); *H04L 67/34* (2013.01); *H04L 41/0859* (2013.01)

(58) Field of Classification Search
CPC ........ G06F 15/00; G06F 15/16; G06F 15/161; G06F 15/163; G06F 15/17; G06F 15/17325; G06F 15/17343; G06F 15/177; G06F 13/00–13/10; G06F 13/382–13/387; G06F 13/42; G06F 17/00; G06F 17/30; G06F 17/30002; G06F 17/30283;

(Continued)

(56) References Cited

U.S. PATENT DOCUMENTS

| | | | | |
|---|---|---|---|---|
| 5,506,838 A | * | 4/1996 | Flanagan | 370/258 |
| 5,603,027 A | * | 2/1997 | Ohkami | 717/170 |

(Continued)

FOREIGN PATENT DOCUMENTS

EP    2086206 A1    8/2009

OTHER PUBLICATIONS

Druschel, Peter et al., "Past a large-scale, persistent peer-to-peer storage utility", IEEE 2001.

(Continued)

*Primary Examiner* — Brian J Gillis
*Assistant Examiner* — Boris Grijalva Lobos
(74) *Attorney, Agent, or Firm* — Brian F. Russell; Randall J. Bluestone (57) ABSTRACT

In at least one embodiment, in response to introduction of a first storage node into a storage network including a plurality of storage nodes, the first storage node discovers at least one second storage node that is a peer storage node. The first storage node downloads one or more versions of one or more shared soft configurations from the second peer storage node. In response to selection of a first version of a first shared soft configuration for activation, the first storage node subscribes to the first shared soft configuration and activates the first version of the selected shared soft configuration on the first storage node. Thereafter, in response to an update of the first shared soft configuration to a second version on the first storage node, the first storage node propagates the second version of the first shared soft configuration to the second storage node.

16 Claims, 8 Drawing Sheets

(58) Field of Classification Search
CPC . G06F 21/00; G06F 21/50; H04L 7/00; H04L 41/00; H04L 41/08–41/082; H04L 41/084; H04L 41/0846; H04L 41/0876–41/0886; H04L 41/0893; H04L 45/00; H04L 45/02; H04L 49/00; H04L 67/10; H04L 67/1002; H04L 67/1061; H04L 67/1068; H04L 67/1095; H04L 41/0859; H04L 67/1097; H04L 67/34
USPC .............. 707/638, 609, 610, 622, 623, 655; 717/168, 170, 171, 177–178; 709/220–222, 208, 226
See application file for complete search history.

(56) References Cited

U.S. PATENT DOCUMENTS

| | | | | |
|---|---|---|---|---|
| 5,787,262 | A * | 7/1998 | Shakib | G06F 9/52 707/999.008 |
| 5,951,639 | A * | 9/1999 | MacInnis | 725/70 |
| 6,014,669 | A * | 1/2000 | Slaughter et al. | 707/610 |
| 6,236,662 | B1 * | 5/2001 | Reilly | H04W 52/46 370/462 |
| 6,363,416 | B1 * | 3/2002 | Naeimi et al. | 709/209 |
| 6,449,641 | B1 * | 9/2002 | Moiin et al. | 709/220 |
| 6,526,441 | B2 * | 2/2003 | Yamaguchi et al. | 709/220 |
| 6,654,954 | B1 * | 11/2003 | Hicks | 717/162 |
| 6,766,334 | B1 * | 7/2004 | Kaler et al. | |
| 6,804,689 | B1 * | 10/2004 | Havrda et al. | 707/661 |
| 6,978,281 | B1 * | 12/2005 | Kruy et al. | |
| 7,120,690 | B1 * | 10/2006 | Krishnan et al. | 709/225 |
| 7,231,461 | B2 * | 6/2007 | Laschkewitsch et al. | 709/248 |
| 7,240,088 | B2 * | 7/2007 | Block et al. | 709/201 |
| 7,269,198 | B1 * | 9/2007 | Elliott | H04W 40/246 370/252 |
| 7,269,648 | B1 * | 9/2007 | Krishnan et al. | 709/224 |
| 7,287,180 | B1 * | 10/2007 | Chen | G06F 11/2033 714/11 |
| 7,360,208 | B2 * | 4/2008 | Joshi et al. | 717/168 |
| 7,373,476 | B2 * | 5/2008 | Asano | G06F 3/0605 711/114 |
| 7,587,475 | B2 * | 9/2009 | Koneru | 709/221 |
| 7,702,741 | B2 * | 4/2010 | Yuan et al. | 709/208 |
| 7,996,608 | B1 * | 8/2011 | Chatterjee | G06F 11/1096 711/114 |
| 8,108,495 | B1 * | 1/2012 | Zuk et al. | 709/220 |
| 8,316,411 | B2 | 11/2012 | Weintraub et al. | |
| 8,332,497 | B1 * | 12/2012 | Gladish et al. | 709/223 |
| 8,352,692 | B1 | 1/2013 | Jordan | |
| 8,892,689 | B1 * | 11/2014 | Mowry | 709/219 |
| 9,213,610 | B2 * | 12/2015 | Durham | G06F 11/2069 |
| 9,213,611 | B2 * | 12/2015 | Ludwig | G06F 11/2069 |
| 2001/0044879 | A1 | 11/2001 | Moulton et al. | |
| 2003/0041138 | A1 * | 2/2003 | Kampe et al. | 709/223 |
| 2003/0093501 | A1 * | 5/2003 | Carlson et al. | 709/220 |
| 2003/0105847 | A1 * | 6/2003 | Jennery et al. | 709/223 |
| 2004/0015953 | A1 * | 1/2004 | Vincent | 717/173 |
| 2004/0073747 | A1 * | 4/2004 | Lu | G06F 3/0605 711/114 |
| 2004/0083278 | A1 * | 4/2004 | Becherer | 709/221 |
| 2005/0055575 | A1 * | 3/2005 | Evans et al. | 713/201 |
| 2005/0065913 | A1 * | 3/2005 | Lillie et al. | 707/3 |
| 2006/0248381 | A1 * | 11/2006 | Fujita | G06F 11/2069 714/6.22 |
| 2006/0282458 | A1 * | 12/2006 | Tsyganskiy et al. | 707/102 |
| 2007/0046422 | A1 * | 3/2007 | Fair | G05B 15/02 340/3.7 |
| 2007/0143446 | A1 * | 6/2007 | Morris | 709/219 |
| 2008/0005288 | A1 * | 1/2008 | Kodama | G06F 11/2069 709/220 |
| 2008/0027825 | A1 * | 1/2008 | Boonie et al. | 705/26 |
| 2008/0126306 | A1 * | 5/2008 | Corona | 707/3 |
| 2008/0130639 | A1 | 6/2008 | Costa-Requena et al. | |
| 2008/0181131 | A1 * | 7/2008 | Raghavan et al. | 370/254 |
| 2009/0063650 | A1 | 3/2009 | Anslow et al. | |
| 2009/0125656 | A1 * | 5/2009 | Haas et al. | 710/104 |
| 2009/0150523 | A1 | 6/2009 | Gray et al. | |
| 2009/0182834 | A1 | 7/2009 | Zettler et al. | |
| 2011/0010434 | A1 | 1/2011 | Eleftheriou et al. | |
| 2012/0047346 | A1 * | 2/2012 | Kawaguchi | G06F 3/0605 711/165 |
| 2012/0089863 | A1 * | 4/2012 | Goto | G06F 11/2035 714/4.11 |
| 2012/0163235 | A1 * | 6/2012 | Ho et al. | 370/254 |
| 2012/0257603 | A1 * | 10/2012 | Mercier | 370/338 |
| 2013/0198553 | A1 * | 8/2013 | Oguro | G06F 1/305 713/340 |
| 2013/0247128 | A1 | 9/2013 | Hinchliffe et al. | |
| 2014/0075240 | A1 * | 3/2014 | Maeda | G06F 11/2069 714/6.23 |
| 2014/0297774 | A1 * | 10/2014 | Munupalle et al. | 709/208 |

OTHER PUBLICATIONS

International Application No. PCT/IB2014/066792, International Filing Date: Dec. 11, 2014, International Search Report and Written Opinion dated Apr. 30, 2015.

* cited by examiner

CONFIGURATION UPDATES ACROSS PEER STORAGE SYSTEMS

BACKGROUND OF THE INVENTION

This disclosure relates to data processing storage, and more specifically, to configuration updates across peer storage systems in a storage network.

A large scale network may include many identical or similar instances of storage equipment. In order to deploy a new configuration, an administrator or vendor may script a program that mass duplicates and updates configurations across all instances of the storage equipment from a central server. Programming and testing such scripts to ensure they correctly interface with the storage equipment's application programming interface (API) are time consuming and cumbersome tasks.

Alternatively, an administrator or vendor may deploy a software product that externally manages and proliferates like configurations across storage equipment. However, such software products typically do not support configuration changes on the storage equipment on which the software product runs as part of a mass configuration update, thus hindering experimentation with different configurations and configuration flexibility.

BRIEF SUMMARY

In at least one embodiment, in response to introduction of a first storage node into a storage network including a plurality of storage nodes, the first storage node discovers at least one second storage node that is a peer storage node. The first storage node downloads one or more versions of one or more shared soft configurations from the second peer storage node. In response to selection of a first version of a first shared soft configuration for activation, the first storage node subscribes to the first shared soft configuration and activates the first version of the selected shared soft configuration on the first storage node. Thereafter, in response to an update of the first shared soft configuration to a second version on the first storage node, the first storage node propagates the second version of the first shared soft configuration to the second storage node.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Those skilled in the art will appreciate upon reference to the foregoing that elements of a storage system as described herein, including storage elements and/or control elements, may be co-located or distributed. Distributed embodiments include distributed information technology (IT) environments commonly referred to in the art as "cloud" computing environments. It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
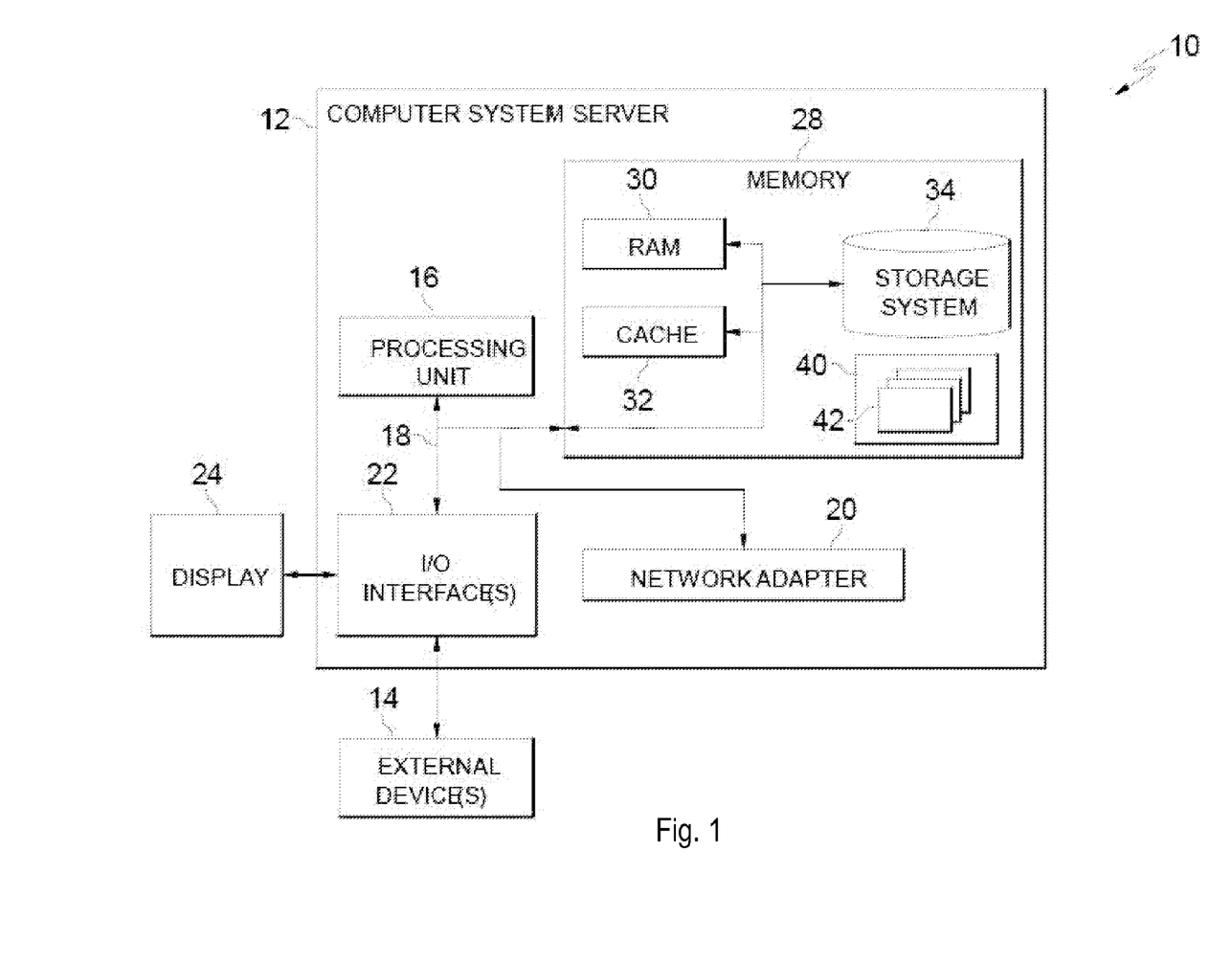
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Further, node 10 can be implemented as a storage node 10 that provides storage and/or computing services.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 can be a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In embodiments in which node 10 is implemented as a storage node, processing unit 16 may be configured through the execution of program/utility 40 (which can include software and/or firmware) to serve as a storage controller. In other embodiments of a storage node 10, the storage controller can be implemented in programmable logic (e.g., programmable logical array (PLA) or field programmable gate array (FPGA)) and/or in hardware.

Figure 2:
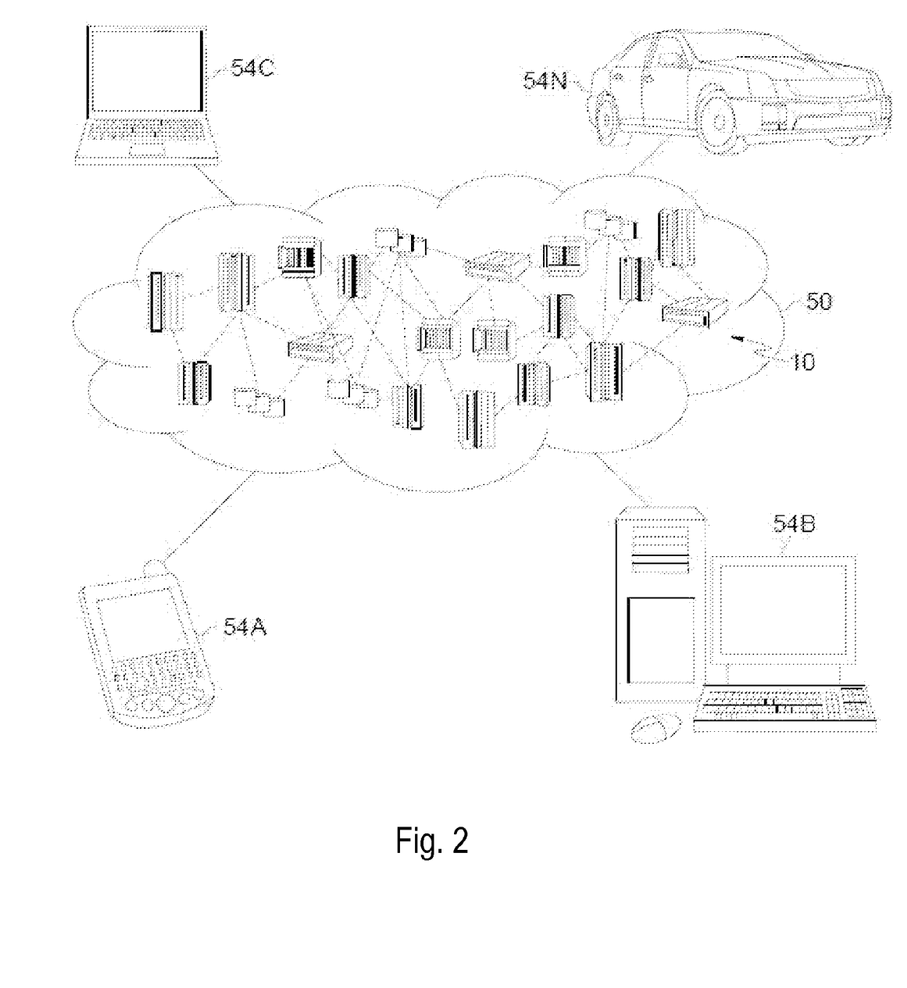
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
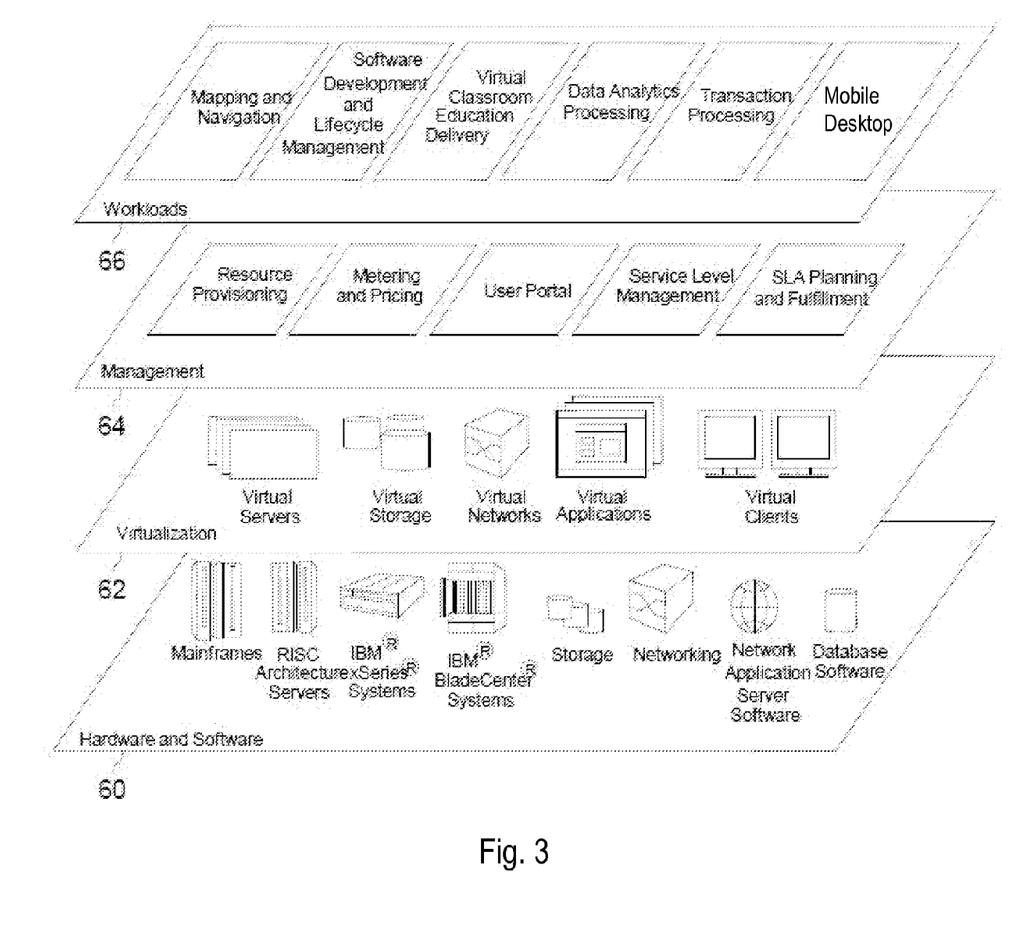
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

In the foregoing discussion, it should be appreciated that storage can being deployed in many different ways within cloud computing environment 50. For example, the storage equipment can be virtualized behind an application or a storage virtualization layer in a storage area network (SAN) or server. Alternatively or additionally, storage equipment can be aggregated or deployed with like kinds of storage systems providing shared or direct access to a set of servers. Alternatively or additionally, the storage equipment can be implemented in a hyperscale environment in which a scaled out network of servers and storage have a distributed volume and lock manager and a common name space. Alternatively or additionally, the storage equipment can be implemented in the hyper-converged configuration in which a set of networked servers have built-in storage, but instead of serving as a dedicated pool of storage with each server participating in responding to storage requests, every server performs both computational and storage tasks. Further, the storage equipment deployed in cloud computing environment 50 can include various types of storage media, including non-volatile random access memory (NVRAM) (e.g., flash memory, magneto-resistive random access memory (MRRAM), phase change memory (PCM), etc.), magnetic and/or optical disk storage, tape storage, etc.

The storage configuration techniques disclosed herein are designed to ease configuration of multiple homogeneous or heterogeneous networked storage systems that it would be desirable to configure with similar soft configurations. The soft configurations referred to herein do not refer to strictly hardware configurations, such the type or storage capacity of storage media within storage systems, but rather refer to software-configurable features of the storage system, such as security, storage partitioning, user control, distributed and/or local error correction (e.g., RAID), default settings for interface adapters, which firmware version is to be used, operating system (OS) settings, storage feature settings, tiering priorities, etc. Configuration updates are preferably made on a lazy basis, that is, implemented as needed on any storage system and then propagated from that storage system to peer storage systems that have previously subscribed.

In preferred embodiments, new storage systems added to the network discover all "peer" storage systems and then download possible soft configuration(s). In some embodiments, a user, such as an administrator, selects soft configuration(s) to subscribe to from peers in the storage network and then applies a desired soft configuration to the newly added storage system. If a configuration is incompatible with the storage system, the soft configuration will not be applied or subscribed to by the new storage system.

Further, in preferred embodiments, configuration modifications and/or additions can be optionally appended to an existing shared configuration, or bundled into a new shared configuration. Changes to existing shared configurations are verified to not conflict with other changes, and if not in conflict, the changes are pushed to all peer storage systems that have subscribed to the configuration.

In preferred embodiments, a storage system that receives a configuration notice checks the soft configuration of which it was notified against its existing soft configuration and verifies the new soft configuration is compatible. If the new soft configuration is incompatible, the storage system can issue a notice and unsubscribe to the new soft configuration.

In preferred embodiments, if a storage device is removed from the peer network and subsequently re-introduced, subscribed configurations are cross-referenced against those in the existing peer network, updated if applicable, and either unsubscribed or reinstantiated as new shared configurations.

Figure 4A:
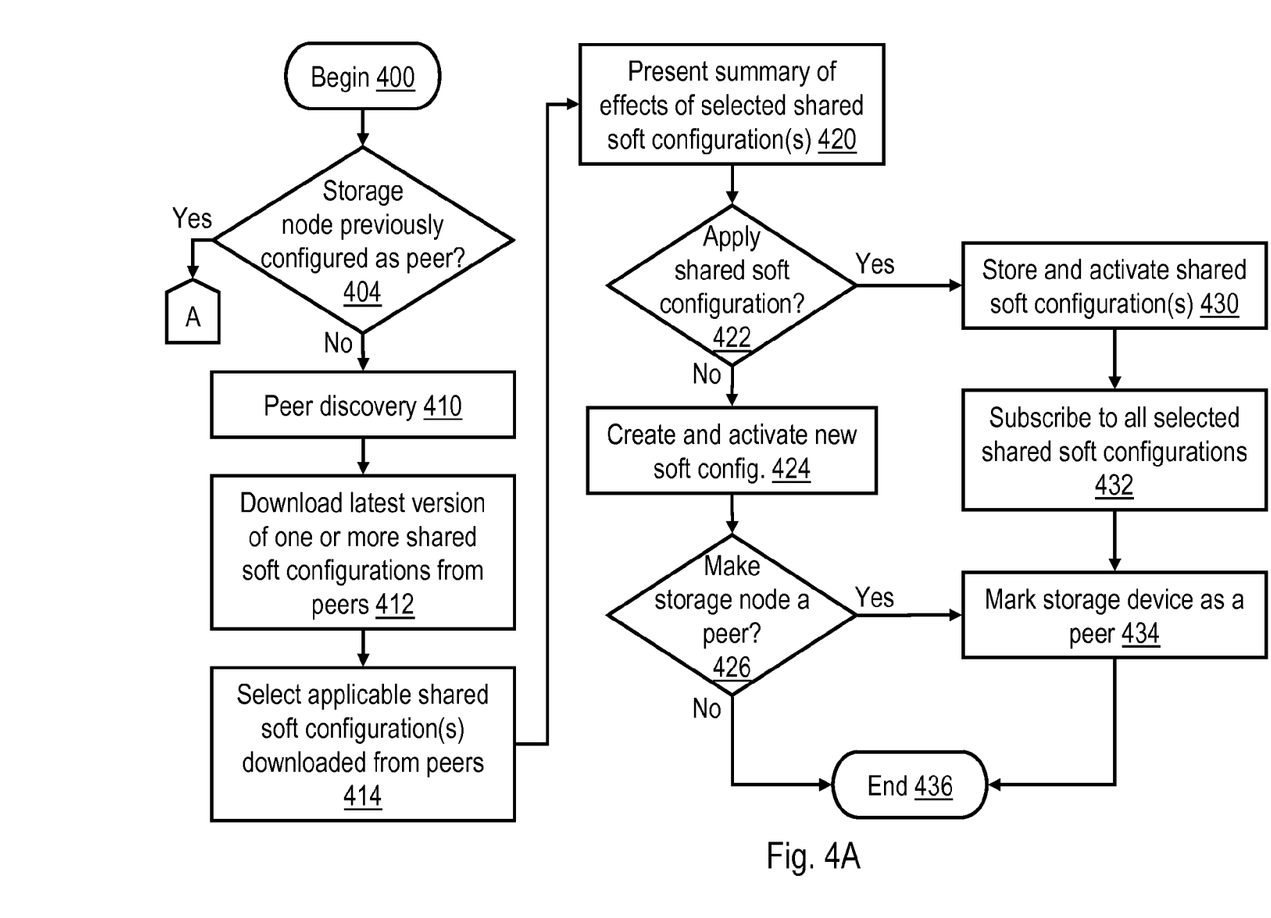
FIGS. 4A-4B together form a high level logical flowchart of an exemplary process for adding a storage device to a storage network in accordance with one embodiment.
Figure 4B:
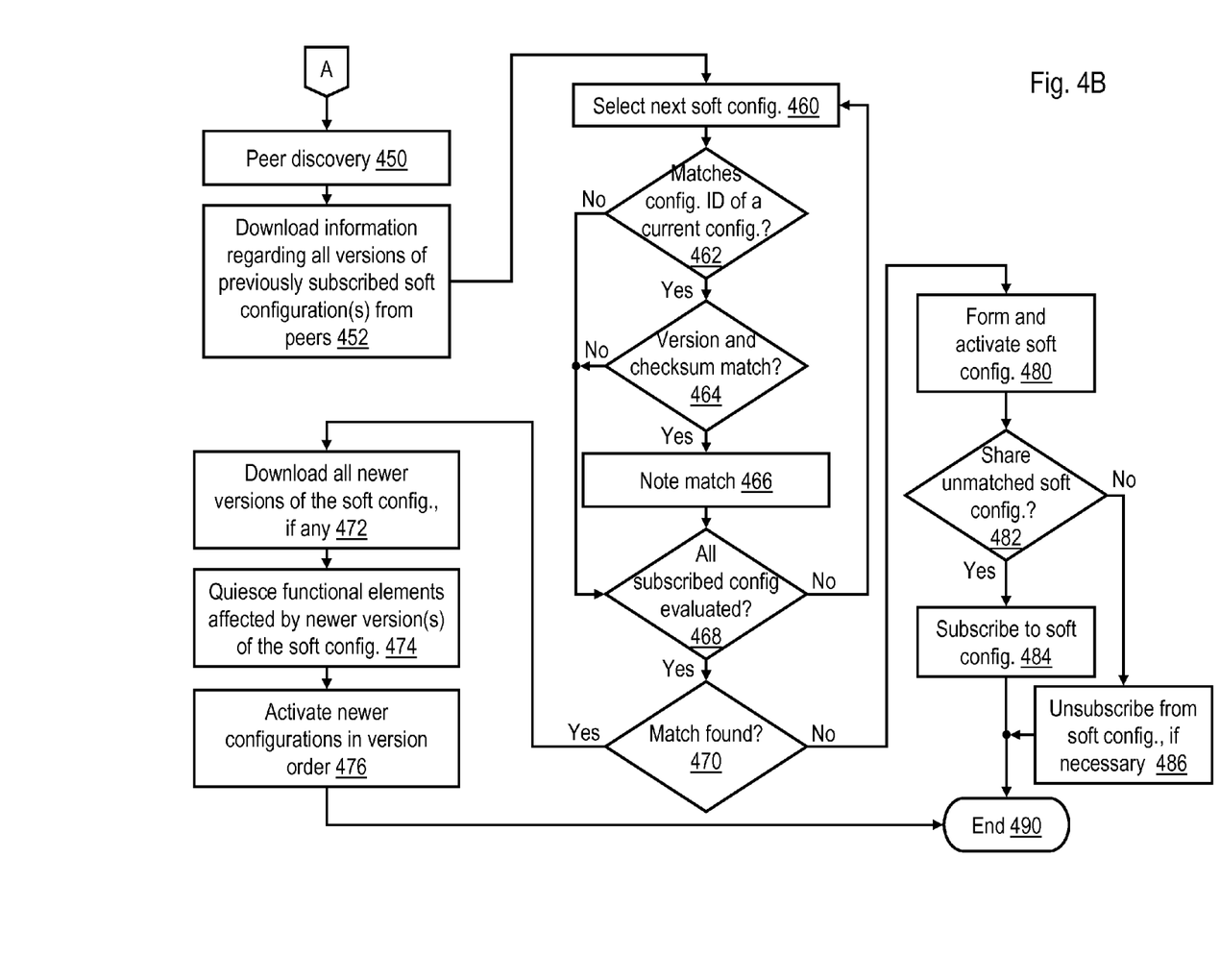

Referring now to FIGS. 4A-4B, there is depicted a high level logical flowchart of an exemplary process by which a storage device is added to a storage network in accordance with one embodiment. The process can be performed, for example, by a storage node 10 (which may also include computing resources) in cloud computing environment 50 through execution of a configuration program 40, such as firmware or an operating system of storage node 10.

Figure 5:
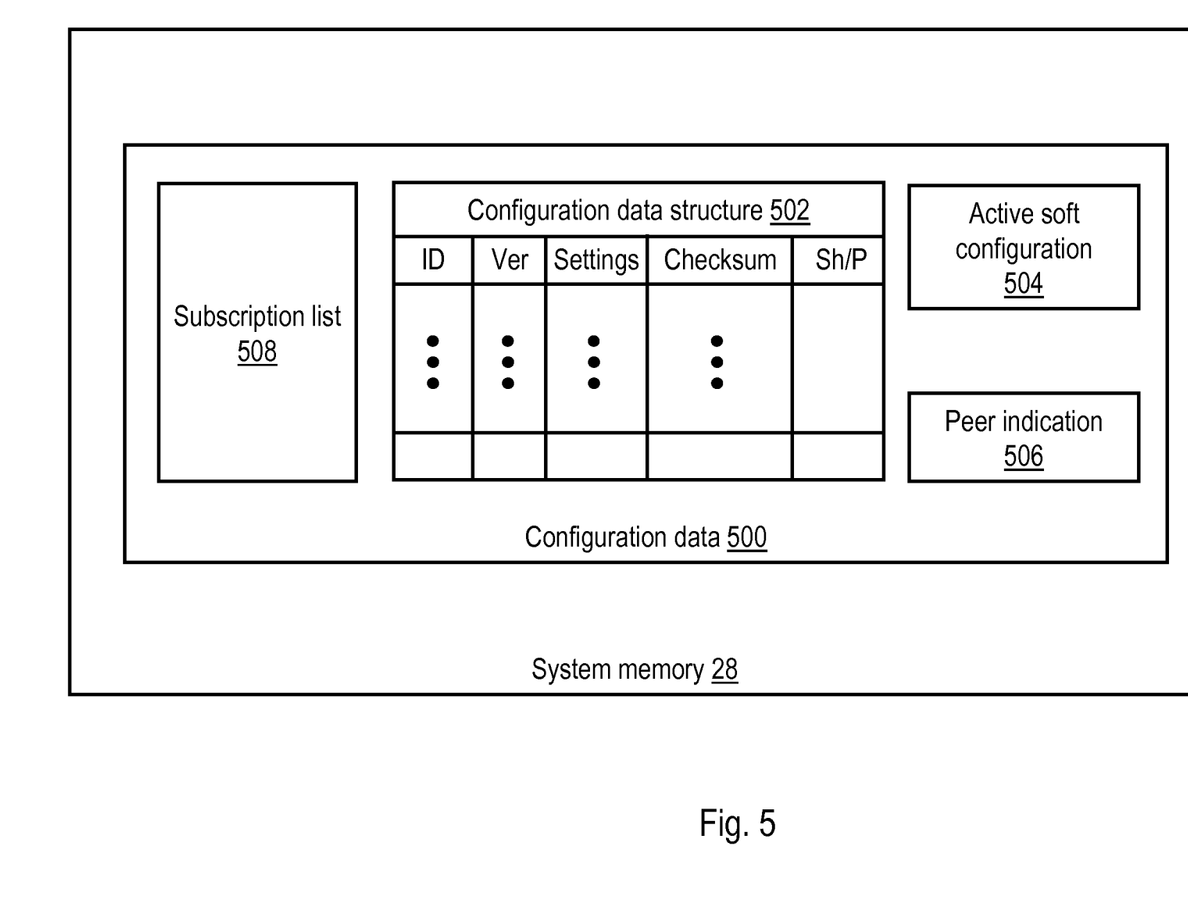
FIG. 5 is a block diagram of exemplary configuration data in the system memory of a storage node.

The process begins at block 400, for example, in response to a storage node 10 being coupled to a network, such as cloud computing network 50, and powered on. As part of its boot process or thereafter, node 10 checks its memory 28 to determine whether or not it has previously been configured as a peer storage node, as evidenced, for example, by a configuration history or the presence of one or more shared soft configurations in memory 28 (block 404). For example, FIG. 5 illustrates that the configuration data 500 in the system memory 28 of a storage node 10 that has been configured can include a configuration data structure 502 that can hold one or more versions of one or more soft configurations. As indicated, in one embodiment, each soft configuration can include, in addition to its settings, a unique configuration identifier (ID) (which can include a name and/or other identifier), a version number (Ver) of the shared soft configuration, a checksum of the soft configuration, and an indication of whether the soft configuration is available for sharing or private to the storage node (Sh/P). In response to a determination at block 404 that storage node 10 has previously been configured as a peer storage node (e.g., as indicated by configuration data structure 502 already containing a soft configuration marked as shared), the process passes through page connector A to block 450 of FIG. 4B, which is described in detail below. In response to a determination at block 404 that storage node 10 has not been previously configured as a peer storage node, the process passes to block 410, which illustrates storage node 10 participating in a peer discovery process to discover one or more peer storage nodes in cloud computing environment 50 that host shared soft configurations. The peer discovery process is preferably autonomous in that user input is not required to identify peer storage nodes within the storage network. At block 412, storage node 10 downloads the latest version of each of one or more shared soft configurations available from the peer storage nodes discovered at block 410.

At block 414, one or more applicable shared soft configurations are selected from among those downloaded at block 412 for possible application to storage node 10. The selection can be made manually, for example, through a management console by an administrator or other user that installed storage node 10. Storage node 10 may further automatically eliminate from consideration one or more inapplicable shared soft configurations that are fundamentally incompatible with storage node 10. At block 420, storage node 10 presents a summary of the effects of the selected shared soft configuration(s) if activated on storage node 10. For example, the summary, which may be presented through the management console, can indicate an amount (or percentage) of the storage capacity of storage node 10 that will be allocated to one or more logical unit numbers (LUNs), a local or distributed RAID configuration that will be employed, a caching configuration, etc. The summary presentation of the effects of the configuration can also include warnings regarding violations of recommendations associated with the selected shared soft configuration(s) (e.g., "Recommendation: this configuration is recommended for firmware version 2.6 or above").

At block 422, storage node 10 determines whether or not the selected shared soft configuration(s) are to be applied to storage node 10 in light of the summary of effects presented at block 420. The determination depicted at block 422 can be made, for example, based on one or more user input received by storage node 10 via the management console. In response to a negative determination at block 422, storage node 10 creates and stores a new soft configuration (block 424), for example, in response to one or more inputs received via a management console. The new soft configuration can be stored within configuration data structure 502. As further shown at block 424, storage node 10 also activates the newly created soft configuration, for example, by designating the newly created soft configuration as active soft configuration 504. In preferred embodiments, the activation of the soft configuration is performed independently of the creation of the soft configuration, meaning that the mere creation (and/or storage) of the soft configuration on storage node 10 does not necessitate activation of the soft configuration and that storage node 10 can store one or more versions of one or more soft configurations that are inactive (but available for activation on storage node 10). It should be further noted that the creation of the soft configuration does not necessitate that the soft configuration is a shared soft configuration or is propagated to other storage nodes. Consequently, if desired, the soft configuration can be shared only after it has been experimentally tested on storage node 10.

At block 426, storage node 10 additionally determines whether or not to make storage node 10 a peer storage node, that is, to configure storage node 10 such that it will respond to future peer discovery requests and share its soft configuration(s). Again, storage node 10 can make the determination illustrated at block 426 based on one or more user inputs received via a management console. In response to a negative determination at block 426, the process of FIG. 4A ends at block 436. If, however, storage node 10 determines at block 426 that storage node 10 should be configured as a peer storage node, the process proceeds from block 426 to block 434, which illustrates storage node 10 configuring itself as a peer storage node, for example, by setting a peer indication 506 in its configuration data 500. Thereafter, the process of FIG. 4A ends at block 436.

Returning to block 422, in response to a determination to apply one or more selected shared soft configurations, storage node 10 stores and activates the one or more selected shared soft configurations on storage node 10, for example, by storing the shared soft configuration(s) in configuration data structure 502 and establishing the shared soft configurations as active soft configurations 504 (block 430). In addition, at block 432, storage node 10 subscribes to all of the one or more selected shared soft configurations, for example, by storing its node ID in association with the unique configuration identifier and version number of each of the one or more selected shared soft configurations in a subscription list 508. Thereafter, the process of FIG. 4A passes to blocks 434 and 436, which have been described.

Referring now to FIG. 4B, a portion of the process applicable to the addition of a storage node 10 that was previously configured as a peer storage node in cloud computing environment 50 is depicted. Following page connector A, storage node 10 participates in a peer discovery process to discover one or more peer storage nodes in cloud computing environment 50 that host shared soft configurations (block 450). Next, at block 452, storage node 10 preferably downloads information regarding all versions of shared soft configurations available from the peer storage nodes discovered at block 452. As noted above, the information can include, for example, a unique configuration identifier (which can include a name and/or other identifier), a version number of the shared soft configuration, a checksum of the configuration, and optionally, an identifier of a type of peer storage node configured with the shared soft configuration.

At block 460 the process depicted in FIG. 4B enters a loop in which all of the soft configurations for which information was downloaded at block 452 are evaluated. Thus, at block 460 a next soft configuration to be evaluated is selected. At block 462, storage node 10 determines whether or not the configuration identifier of the soft configuration under consideration matches that of one of the existing soft configuration(s) of storage node 10 recorded in configuration data structure 502. If not, the process passes to block 468, which is described below. However, in response to storage node 10 determining that the configuration identifier of the soft configuration being evaluated matches that of one of the existing soft configuration(s) of storage node 10, storage node 10 further determines at block 464 whether both the version number and checksum of the soft configuration under evaluation match those of the existing soft configuration. This additional check is utilized to verify that the soft configurations actually match rather than merely share the same configuration identifier and version number, as can possibly arise when two different private configurations are built upon the base of a common shared configuration. In response to a negative determination at block 464, the process passes to block 468, which is described below. However, in response to a determination at block 464 that the version numbers and checksums both match, the match is recorded, as depicted at block 466. Next, at block 468, storage node 10 determines whether or not all of the soft configurations for which information was downloaded at block 452 have been evaluated. In response to a determination at block 468 that all such soft configurations have not been evaluated, the process returns to block 460, which has been described. Otherwise, the process proceeds to block 470.

At block 470, storage node 10 determines whether or not any matches were founded by the evaluation performed in the loop including blocks 460-468. If not, the process proceeds to block 480, which is described below. If so, the process passes to block 472. At block 472, storage node 10 downloads the settings of all newer versions (e.g., indicated by higher version numbers), if any, of the soft configuration. Although the newer versions of the soft configuration can be downloaded from any peer storage node in cloud computing environment 50, in one embodiment storage node 10 downloads the newer version(s), if any, of the soft configuration from the same peer storage node that supplied the information regarding the soft configuration at block 452. In preparation for application of the newer version(s) of the soft configuration, storage node 10 quiesces any functional elements that would be affected by the downloaded newer version(s) of the soft configuration (block 474). In some embodiments, storage node 10 then activates the newer versions of the soft configuration in version order (block 476). In alternative embodiments, only a selected version (e.g., a newest version) of the soft configuration is activated. Following block 476, the process given in FIG. 4B ends at block 490.

Referring now to block 480, storage node 10 forms and activates a soft configuration, which can be one of the soft configurations already present in configuration data structure 502, a derivative thereof, or a completely new soft configuration. The formation of the soft configuration can be performed responsive to one or more user inputs received through a management console. At block 482 storage node 10 further determines whether or not its unmatched soft configuration is to be made available for sharing, for example, based on one or more user inputs received via a management console. In response to a determination at block 482 that the soft configuration is to be made available for sharing, storage node 10 subscribes to the new shared soft configuration to ensure that any change to the shared soft configuration by any peer storage node will be propagated back to storage node 10 (block 484). In performing the steps indicated at blocks 480 and 484, storage node 10 preferably makes the previously described updates to configuration data structure 502, active soft configuration 504 and subscription list 508. In response to a determination at block 482 to not make the unmatched soft configuration available for sharing (i.e., to keep the soft configuration as a private configuration), storage node 10 unsubscribes from the soft configuration, if necessary (block 486). Following block 484 or block 486, the process of FIG. 4B ends at block 490.

Figure 6:
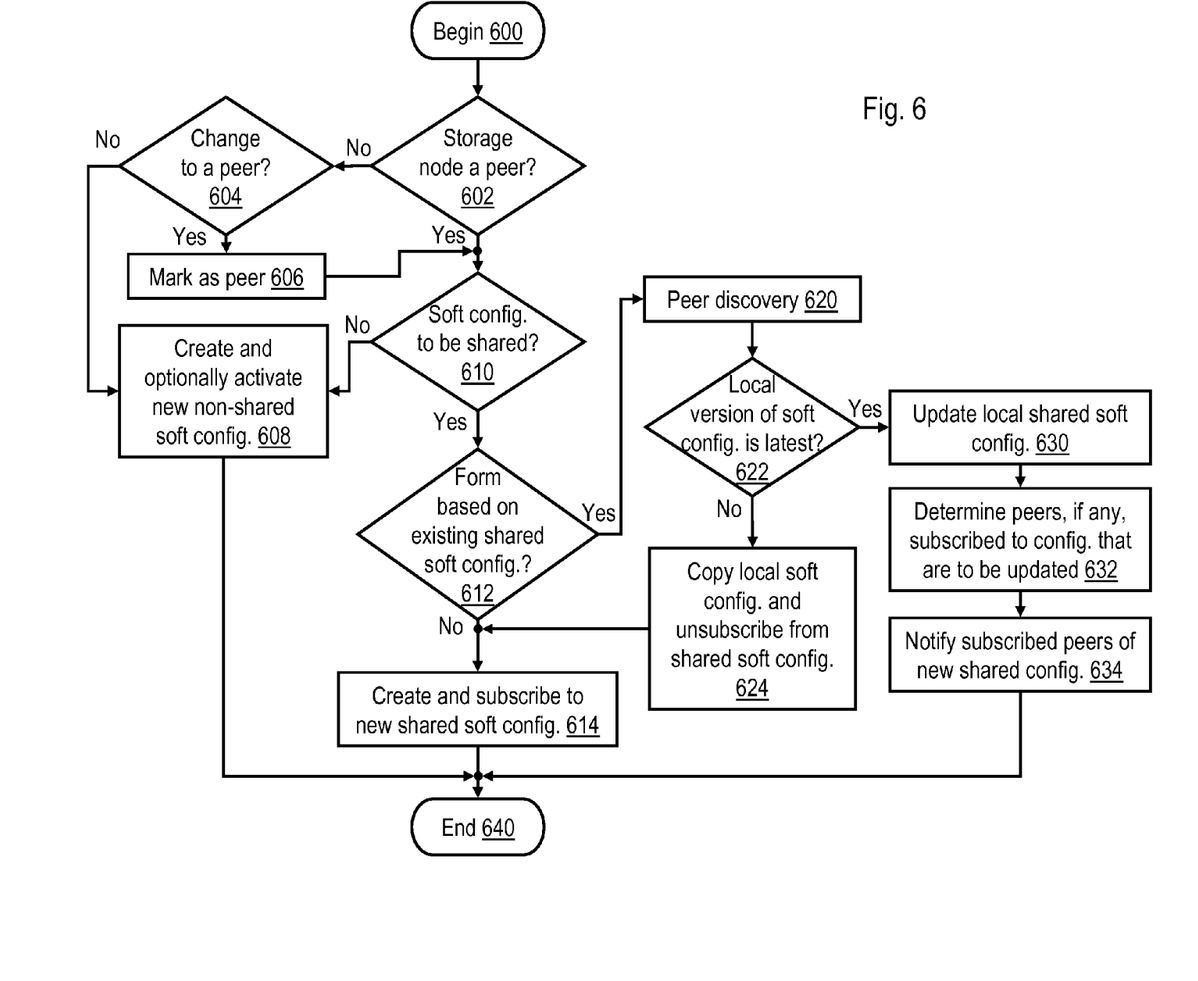
FIG. 6 is a high level logical flowchart of an exemplary process for modifying a configuration of a storage device in accordance with one embodiment.

With reference now to FIG. 6, there is illustrated a high level logical flowchart of an exemplary process for modifying a configuration of a storage device in accordance with one embodiment. The process can be performed, for example, by a storage node 10 (which may also include computing resources) in cloud computing environment 50 through execution of a configuration program 40, such as firmware or an operating system of storage node 10.

The process begins at block 600 in response to an input indicating a desire to add or change a soft configuration of storage node 10. The process then proceeds from block 600 to block 602, which depicts storage node 10 determining (e.g., by reference to peer indication 506 in memory 28) whether or not storage node 10 is presently configured as a peer storage node, that is, whether storage node 10 is configured to update the soft configuration of other peer storage nodes and have its soft configuration updated by other peer storage nodes. In response to a determination that storage node 10 is presently configured as a peer storage node, the process passes to block 610, which is described below.

However, in response to a determination that storage node 10 is not presently configured as a peer storage node, storage node 10 further determines (e.g., based on one or more user inputs received from a management console) whether or not storage node 10 is to be configured as a peer storage node (block 604). If so, storage node 10 updates peer indication 506 in memory 28 to reflect that it is a peer storage node (block 606), and the process passes to block 610. If not, storage node 10 creates and optionally activates on storage node 10 a new private soft configuration based on one or more user inputs received via a management console (block 608). In some cases, the new private soft configuration can be created based on an existing shared soft configuration to which storage node 10 subscribes. Following block 608, the process of FIG. 6 ends at block 640.

Referring now to block 610, storage node 10 determines whether or not the new soft configuration resulting from the requested addition or modification is to be a shared with peer storage nodes. If not, the process passes to block 608, which has been described. If, however, storage node 10 determines at block 610 that the new soft configuration is to be a shared soft configuration, storage node 10 further determines at block 612 whether the new shared soft configuration is to be created based on an existing shared soft configuration of storage node 10. In response to a negative determination at block 612, storage node 10 creates a new shared soft configuration based on one or more user inputs (e.g., received via a management console). The new shared soft configuration will have associated therewith a unique configuration identifier, an initial version number and a checksum, which storage node 10 stores within configuration data structure 502. As further indicated at block 614, storage node 10 additionally subscribes to the new shared soft configuration, so that, as a peer storage node, storage node 10 will be updated if another peer storage node subsequently updates the soft configuration. Following block 614, the process of FIG. 6 ends at block 640.

Returning to block 612, in response to a determination that the new shared soft configuration is to be formed based on an existing shared soft configuration of storage node 10, storage node 10 participates in a peer discovery process to discover one or more peer storage nodes in cloud computing environment 60 that host the shared soft configuration (block 620). As part of this peer discovery process, peer storage nodes hosting the same shared soft configuration provide storage node 10 their latest version number(s) of the shared soft configuration.

At block 622, storage node 10 determines by reference to the version number(s) received from the peer storage node(s) whether or not the local version of the shared soft configuration residing on storage node 10 is the latest version. In the depicted embodiment, in response to a determination at block 622 that the local version of the shared soft configuration is not the latest version, storage node 10 copies the local soft configuration so that the copy can be modified and unsubscribes from the shared soft configuration so that the shared soft configuration is no longer subject to updates by peer storage nodes (block 624). In other embodiments, storage node 10 may (e.g., at the user's option) instead perform the update of the shared soft configuration to the latest version, for example, according to process of FIG. 6. Following block 624, the process of FIG. 6 passes to block 614, which has been described.

Referring again to block 622, in response to a determination that the local version of the shared soft configuration is the latest version, storage node 10 updates the local version of the shared soft configuration, for example, as indicated by one or more user inputs received via a management console (block 630). In updating the shared soft configuration, storage node 10 advances the version number, computes a new checksum, and records the updated shared soft configuration in configuration data structure 502. At block 632, storage node 10 determines which peer storage nodes that are subscribed to the shared soft configuration, if any, are to be updated with the new version. In various implementations, block 632 can be implemented, for example, utilizing an opt-in or opt-out policy. Storage node 10 then notifies the peer storage nodes determined at block 632 of the update to the shared soft configuration, thus triggering the update process described below with reference to FIG. 7. Following block 634, the process of FIG. 6 ends at block 640.

Figure 7:
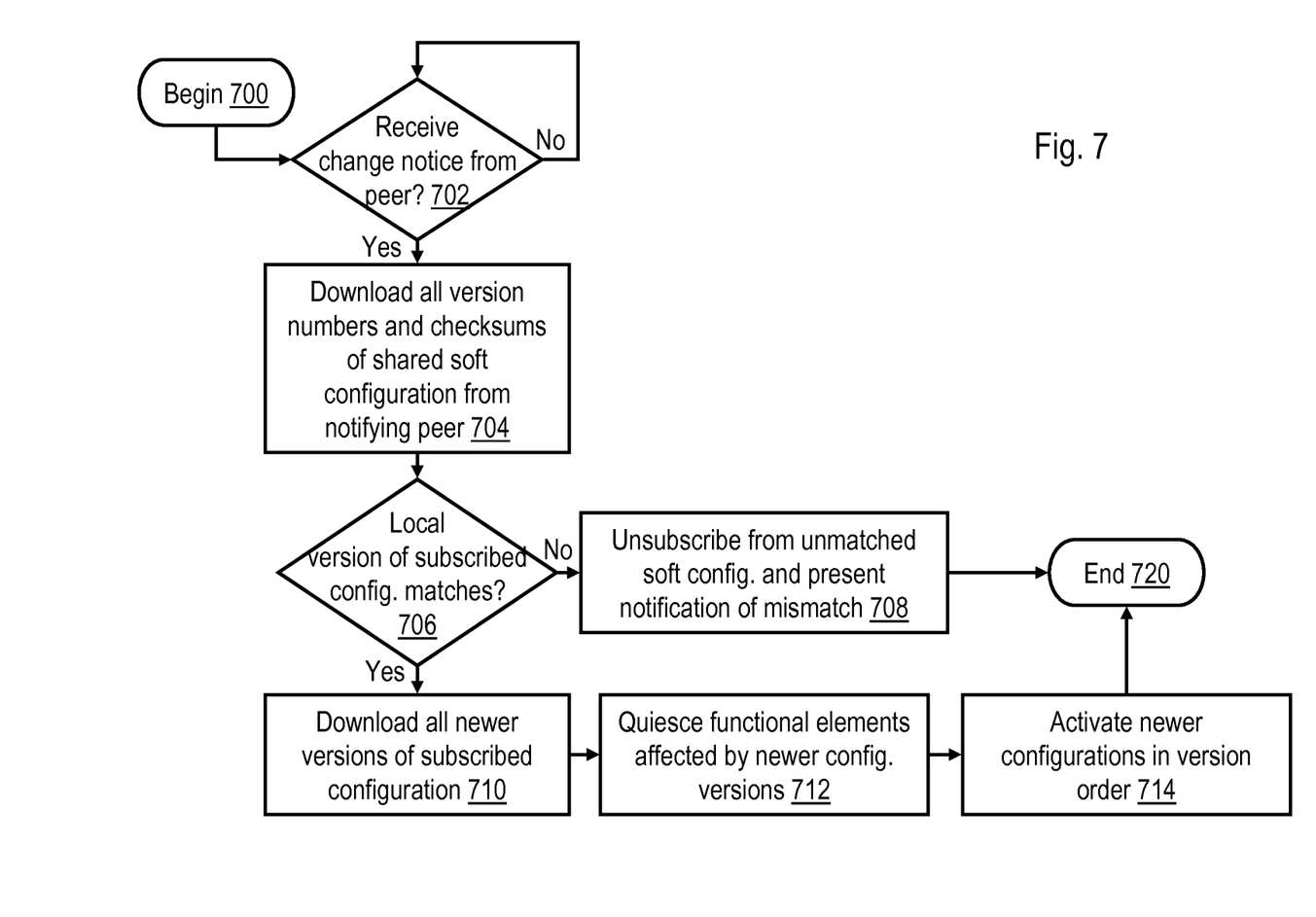
FIG. 7 is a high level logical flowchart of an exemplary process for responding to a change notification from a peer storage device in accordance with one embodiment.

Referring now to FIG. 7, there is depicted a high level logical flowchart of an exemplary process for responding to a change notification from a peer storage device in accordance with one embodiment. The process can be performed, for example, by a storage node 10 (which may also include computing resources) in cloud computing environment 50 through execution of a configuration program 40, such as firmware or an operating system of storage node 10.

The process of FIG. 7 begins at block 700 and then proceeds to block 702, which illustrates a storage node 10 monitoring for receipt of a change notification from a peer storage node. In response to receipt of a change notification, the process proceeds to block 704, which illustrates the storage node 10 downloading all version numbers and associated checksums of the shared soft configuration to which the storage node 10 is subscribed (i.e., the shared soft configuration the change notification concerns) from the notifying peer storage node. At block 706 storage node 10 determines whether its local version of the shared soft configuration matches one of the versions on the peer storage node, for example, by verifying that the version numbers and checksums match. This determination ensures that the shared soft configuration on the peer storage node comes from the same lineage as the local soft configuration on storage node 10.

In response to a determination at block 706 that no match is found, storage node 10 unsubscribes from the soft configuration so that will not receive future change notifications for that soft configuration and additionally presents a notification of the mismatch, for example, via a management console (block 708). Thereafter, the process of FIG. 7 ends at block 720. In response to a determination at block 706 that the local version of the shared soft configuration matches one of the versions on the peer storage node, storage node 10 downloads all newer versions (e.g., indicated by higher version numbers) of the soft configuration (block 710). Although the newer versions of the soft configuration can be downloaded from any peer storage node in cloud computing environment 50, in one embodiment storage node 10 downloads the newer version(s), of the soft configuration from the same peer storage node that supplied the change notification. In preparation for application of the newer version(s) of the soft configuration, storage node 10 quiesces any functional elements affected by the downloaded newer version(s) of the soft configuration (block 712). In some embodiments, storage node 10 then activates the newer versions of the soft configuration in version order (block 714). In alternative embodiments, only a selected version (e.g., a newest version) of the soft configuration is activated. Following block 714, the process given in FIG. 7 ends at block 720.

It should be appreciated upon reference to the foregoing description that the disclosed techniques for propagating a soft configuration across peer storage nodes permits even heterogeneous storage nodes to be configured by a shared soft configuration. For example, a storage node that is added to a storage network may have different types of storage media or a different storage capacity than its peer storage nodes. As one example, by implementing relative rather than absolute configuration parameters, a shared soft configuration can still be applied across heterogeneous storage units. For example, the shared soft configuration may specify that each peer storage node is to establish N LUNs each including 1/Nth of the total storage capacity of the peer storage device. Further, a storage node can modify the shared storage configuration as necessary to account for the capabilities and capacities of that storage node. For example, although a shared soft configuration may specify 1 GB of mirrored write cache, a newly added storage node may configured itself to provide 2 GB of mirrored write cache based on its larger overall storage capacity, but still apply other aspects of the shared soft configuration, such as configuration of the write cache to employ a write back policy and to apply data compression to write data.

One benefit of sharing soft configurations across heterogeneous peer storage nodes is that a peer storage node can be configured to support operation of a heterogeneous storage node or overall health and/or performance of the storage network. For example, in response to the addition of a newly installed storage node including only hard disk drives (HDDs), a peer storage node having high speed flash memory can share its soft configuration to cause the newly installed storage node to track frequency of access by logical address in order to support migration across the network of more frequently accessed (so-called "hotter") data to faster storage devices in order to promote better storage system performance. Soft configurations may similarly be established and shared across heterogeneous storage nodes in order to promote longevity of the storage media within storage nodes.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As has been described, in at least one embodiment, in response to introduction of a first storage node into a storage network including a plurality of storage nodes, the first storage node discovers at least one second storage node that is a peer storage node. The first storage node downloads one or more versions of one or more shared soft configurations from the second peer storage node. In response to selection of a first version of a first shared soft configuration for activation, the first storage node subscribes to the first shared soft configuration and activates the first version of the selected shared soft configuration on the first storage node. Thereafter, in response to an update of the first shared soft configuration to a second version on the first storage node, the first storage node propagates the second version of the first shared soft configuration to the second storage node.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transitory propagating media per se.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of managing a storage network, the method comprising:

in response to introduction of a first storage node into a storage network including a plurality of storage nodes, the first storage node discovering at least one second storage node among the plurality of storage nodes that is a peer storage node;

in response to discovering the at least one second storage node that is a peer storage node, the first storage node downloading one or more at least a first versions of one or more a first shared soft configurations from the at least one second storage node, wherein each of the one or more shared soft configurations specifies at least one of a set including storage partitioning to be applied by a storage node and an error correction scheme to be applied on storage media of a storage node to data stored by the storage node;

in response to selection of a first version of a first shared soft configuration for activation, the first storage node determining whether or not the first storage node already stores a previously employed version of the first shared configuration that matches the first version of the first shared soft configuration downloaded from the second peer storage node;

in response to determining the first storage node does not already store a previously employed version of the first shared configuration:

the first storage node subscribing to the first shared soft configuration, activating the first version of the first shared soft configuration on the first storage node such that operation of the first storage node itself is controlled by the first version of the first shared soft configuration, and adding the first storage node to the storage network as a peer of the at least one second storage node;

thereafter, in response to an update of the first shared soft configuration to a second version on the first storage node, the first storage node propagating the second version of the first shared soft configuration to the at least one second storage node that is a peer of the first storage node; and in response to determining the first storage node stores a previously employed version of the first shared configuration that does not match the first version of the first shared soft configuration downloaded from the second peer storage node, the first storage node forming and activating a second soft configuration on the first storage node in lieu of the first shared soft configuration.

2. The method of claim 1, wherein adding the first storage node to the storage network as a peer of the at least one second storage node includes:
   marking the first storage node as a peer storage node such that the first storage node subsequently participates in peer discovery.

3. The method of claim 1, and further comprising:
   presenting a summary of effects on the first storage node of the first version of the first shared soft configuration prior to the selection of the first version of the first shared software configuration on the first storage node; and
   receiving the selection of the first version of the first shared soft configuration responsive to presentation of the summary.

4. The method of claim 1, and further comprising:
   in response to receipt of a change notification from a third storage node in the storage network, the first storage node verifying a match between a local version of a second soft configuration on the first storage node and a non-current version of the second soft configuration on the third storage node; and
   in response to verifying the match, downloading a latest version of the second soft configuration from the third storage node and activating the latest version of the second soft configuration on the first storage node.

5. The method of claim 1, wherein the first storage node and second storage node are heterogeneous storage nodes having at least one of a set including different types of storage media and different storage capacities.

6. A first storage node, comprising:
   a memory;
   a network adapter; and
   a storage controller coupled to the network adapter and to the memory, wherein the storage controller is configured to cause the first storage node to perform:
      in response to introduction of the first storage node into a storage network including a plurality of storage nodes, the first storage node discovering at least one second storage node among the plurality of storage nodes that is a peer storage node;
      in response to discovering the at least one second storage node that is a peer storage node, the first storage node downloading one or more versions of one or more shared soft configurations from the at least one second storage node, wherein each of the one or more shared soft configurations specifies at least one of a set including storage partitioning to be applied by a storage node and an error correction scheme to be applied on storage media of a storage node to data stored by the storage node;
      in response to selection of a first version of a first shared soft configuration for activation, the first storage node determining whether or not the first storage node already stores a previously employed version of the first shared configuration that matches the first version of the first shared soft configuration downloaded from the second peer storage node;
      in response to determining the first storage node does not already store a previously employed version of the first shared configuration:
         the first storage node subscribing to the first shared soft configuration, activating the first version of the first shared soft configuration on the first storage node such that operation of the first storage node itself is controlled by the first version of the first shared soft configuration, and adding the first storage node to the storage network as a peer of the at least one second storage node;
         thereafter, in response to an update of the first shared soft configuration to a second version on the first storage node, the first storage node propagating the second version of the first shared soft configuration to the at least one second storage node that is a peer of the first storage node; and
      in response to determining the first storage node stores a previously employed version of the first shared configuration that does not match the first version of the first shared soft configuration downloaded from the second peer storage node, the first storage node forming and activating a second soft configuration on the first storage node in lieu of the first shared soft configuration.

7. The first storage node of claim 6, wherein adding the first storage node to the storage network as a peer of the at least one second storage node includes:
   marking the first storage node as a peer storage node such that the first storage node subsequently participates in peer discovery.

8. The first storage node of claim 6, wherein the storage controller is configured to cause the first storage node to perform:
   presenting a summary of effects on the first storage node of the first shared soft configuration prior to the selection of the first version of the first shared software configuration on the first storage node; and
   receiving the selection of the first version of the first shared soft configuration responsive to presentation of the summary.

9. The first storage node of claim 6, wherein the storage controller is configured to cause the first storage node to perform:
   in response to receipt of a change notification from a third storage node in the storage network, the first storage node verifying a match between a local version of a second soft configuration on the first storage node and a non-current version of the second soft configuration on the third storage node; and
   in response to verifying the match, downloading a latest version of the second soft configuration from the third storage node and activating the latest version of the second soft configuration on the first storage node.

10. A storage system, comprising:
    the first storage node of claim 6;
    the second storage node; and
    a network coupling the first and second storage nodes.

11. The storage system of claim 10, wherein the first storage node and second storage node are heterogeneous storage nodes having at least one of a set including different types of storage media and different storage capacities.

12. A program product, comprising:
    a storage device; and
    program code stored in the storage device, wherein the program code, when executed by a first storage node, causes the first storage node to perform:
       in response to discovering at least one second storage node that is a peer storage node, the first storage node downloading one or more versions of one or more shared soft configurations from the at least one second storage node, wherein each of the one or more shared soft configurations specifies at least one of a set including storage partitioning to be applied by a storage node and an error correction scheme to be applied on storage media of a storage node to data stored by the storage node;

in response to selection of a first version of a first shared soft configuration for activation, the first storage node determining whether or not the first storage node already stores a previously employed version of the first shared configuration that matches the first version of the first shared soft configuration downloaded from the second peer storage node;

in response to determining the first storage node does not already store a previously employed version of the first shared configuration:

the first storage node subscribing to the first shared soft configuration, activating the first version of the first shared soft configuration on the first storage node such that operation of the first storage node itself is controlled by the first version of the first shared soft configuration, and adding the first storage node to the storage network as a peer of the at least one second storage node;

thereafter, in response to an update of the first shared soft configuration to a second version on the first storage node, the first storage node propagating the second version of the first shared soft configuration to the at least one second storage node that is a peer of the first storage node; and in response to determining the first storage node stores a previously employed version of the first shared configuration that does not match the first version of the first shared soft configuration downloaded from the second peer storage node, the first storage node forming and activating a second soft configuration on the first storage node in lieu of the first shared soft configuration.

13. The program product of claim 12, wherein adding the first storage node to the storage network as a peer of the at least one second storage node includes:
   marking the first storage node as a peer storage node such that the first storage node subsequently participates in peer discovery.

14. The program product of claim 12, wherein the program code further causes the first storage node to perform:
   presenting a summary of effects on the first storage node of the first shared soft configuration prior to the selection of the first version of the first shared software configuration on the first storage node; and
   receiving the selection of the first version of the first shared soft configuration responsive to presentation of the summary.

15. The program product of claim 12, wherein the program code further causes the first storage node to perform:
   in response to receipt of a change notification from a third storage node in the storage network, the first storage node verifying a match between a local version of a second soft configuration on the first storage node and a non-current version of the second soft configuration on the third storage node; and
   in response to verifying the match, downloading a latest version of the second soft configuration from the third storage node and activating the latest version of the second soft configuration on the first storage node.

16. The program product of claim 12, wherein the first storage node and second storage node are heterogeneous storage nodes having at least one of a set including different types of storage media and different storage capacities.

* * * * *